United States Patent
Eck et al.

(10) Patent No.: US 11,814,101 B2
(45) Date of Patent: Nov. 14, 2023

(54) FRONT END STRUCTURE FOR A MOTOR VEHICLE, IN PARTICULAR FOR A PASSENGER VEHICLE, AND MOTOR VEHICLE, IN PARTICULAR PASSENGER VEHICLE

(71) Applicant: Bayerische Motoren Werke Aktiengesellschaft, Munich (DE)

(72) Inventors: Hans-Peter Eck, Riemerling (DE); Andreas Mayer, Munich (DE); Benjamin Schlaepfer, Munich (DE); Florian Traub, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 17/423,028

(22) PCT Filed: Dec. 16, 2019

(86) PCT No.: PCT/EP2019/085222
§ 371 (c)(1),
(2) Date: Jul. 14, 2021

(87) PCT Pub. No.: WO2020/148042
PCT Pub. Date: Jul. 23, 2020

(65) Prior Publication Data
US 2022/0081035 A1    Mar. 17, 2022

(30) Foreign Application Priority Data

Jan. 15, 2019 (DE) .................... 10 2019 100 906.5

(51) Int. Cl.
*B62D 25/08* (2006.01)
*B62D 21/15* (2006.01)

(52) U.S. Cl.
CPC ......... *B62D 21/152* (2013.01); *B62D 25/082* (2013.01)

(58) Field of Classification Search
CPC ..... B62D 21/152; B62D 25/082; B62D 21/15
(Continued)

(56) References Cited

U.S. PATENT DOCUMENTS

| 4,836,321 | A | 6/1989 | Baumann |
| 8,657,365 | B2 * | 2/2014 | Amano ................ B62D 21/152 |
| | | | 296/187.11 |

(Continued)

FOREIGN PATENT DOCUMENTS

| CN | 109305222 B * | 7/2021 | .............. B60K 1/00 |
| DE | 37 10 808 A1 | 10/1988 | |

(Continued)

OTHER PUBLICATIONS

Cover Page of EP 2 794 386 A1 dated Oct. 29, 2014 (one (1) page).
(Continued)

*Primary Examiner* — Pinel E Romain
(74) *Attorney, Agent, or Firm* — Crowell & Moring LLP

(57) ABSTRACT

A front-end structure for a motor vehicle includes two first bodyshell parts spaced apart from each other in the transverse direction of the vehicle for a self-supporting body of the motor vehicle, and includes a bulkhead in the form of a second bodyshell part for the self-supporting body. At least one assembly carrier forwardly overlaps at least a partial region of the bulkhead in the longitudinal direction of the vehicle and is in the form of a third bodyshell part for the body, and via which the two first bodyshell parts are connected to each another. A carrier element is formed separately from the assembly carrier and separately from the first bodyshell parts, and is mounted on the assembly carrier in a vibration-damped manner via bearing elements and on
(Continued)

which at least one component for the motor vehicle, which component is formed separately from the bodyshell parts, separately from the carrier element and separately from the bearing elements, is held.

9 Claims, 4 Drawing Sheets

(58) Field of Classification Search
USPC .................................................. 296/187.09
See application file for complete search history.

(56) References Cited

U.S. PATENT DOCUMENTS

| 11,203,313 | B2* | 12/2021 | Momii ..................... G01S 7/027 |
| 2002/0100622 | A1 | 8/2002 | Shimizu et al. |
| 2011/0036659 | A1 | 2/2011 | Erjawetz et al. |
| 2012/0248820 | A1 | 10/2012 | Yasui et al. |
| 2014/0300135 | A1 | 10/2014 | Roehrl et al. |
| 2021/0300474 | A1* | 9/2021 | Ghislieri .............. B62D 27/065 |

FOREIGN PATENT DOCUMENTS

| DE | 100 21 044 A1 | 11/2000 |
| DE | 699 10 505 T2 | 4/2004 |
| DE | 10 2009 005 942 A1 | 7/2010 |
| DE | 10 2010 027 592 A1 | 2/2011 |
| WO | WO 2013/092119 A1 | 6/2013 |

OTHER PUBLICATIONS

International Search Report (PCT/ISA/210) issued in PCT Application No. PCT/EP2019/085222 dated Mar. 11, 2020 with English translation (five (5) pages).

German-language Written Opinion (PCT/ISA/237) issued in PCT Application No. PCT/EP2019/085222 dated Mar. 11, 2020 (five (5) pages).

German-language Office Action issued in German Application No. 10 2019 100 906.5 dated Nov. 13, 2019 with (4 pages).

* cited by examiner

FRONT END STRUCTURE FOR A MOTOR VEHICLE, IN PARTICULAR FOR A PASSENGER VEHICLE, AND MOTOR VEHICLE, IN PARTICULAR PASSENGER VEHICLE

BACKGROUND AND SUMMARY OF THE INVENTION

The invention relates to a front-end structure for a motor vehicle, in particular for a passenger motor vehicle. The invention furthermore relates to a motor vehicle, in particular a passenger motor vehicle, having such a front-end structure.

Front-end structures for motor vehicles and unitized bodies for motor vehicles, in particular for passenger motor vehicles, are already well known from the general prior art. The respective front-end structure has at least two first bodyshell parts which are spaced apart from one another in a vehicle transverse direction and which are constituent parts of the unitized body. The unitized body is commonly also referred to as body-in-white or bodyshell. Furthermore, the respective front-end structure comprises a bulkhead which is formed as a second bodyshell part of the unitized body or of the bodyshell. The bulkhead may be at least indirectly connected to the first bodyshell parts. The bulkhead, also referred to as splash wall or partition, which extends for example in a plane which is spanned by the vehicle transverse direction and the vehicle vertical direction, commonly serves to separate the interior compartment of the unitized body or of the motor vehicle in a vehicle longitudinal direction from a region arranged in front of the interior compartment in the vehicle longitudinal direction. In other words, it is commonly the case that the interior compartment is divided from the region in the vehicle longitudinal direction by means of the bulkhead. The region is commonly an accommodating region or an accommodating space. If the motor vehicle has, for example, a hybrid drive or a conventional drive and thus at least one combustion machine by means of which the motor vehicle can be driven, the combustion machine is commonly arranged in the accommodating region. The accommodating region is therefore also referred to as motor compartment.

Furthermore, DE 37 10 808 A1 discloses the support of body structures, which are deformed with energy-absorbing action, on an elastically mounted front motor of motor vehicles.

It is an object of the present invention to further develop a front-end structure and a motor vehicle of the type mentioned in the introduction such that particularly good crashworthiness and particularly high stiffness of the unitized body, and a particularly advantageous connection of at least one component to the body, can be realized.

This object is achieved according to the invention by means of a front-end structure and by means of a motor vehicle having the front-end structure, in accordance with the independent claims. Advantageous refinements of the invention emerge from the dependent claims.

A first aspect of the invention relates to a front-end structure for a motor vehicle, in particular for a passenger motor vehicle. The front-end structure comprises at least two first bodyshell parts, which are spaced apart from one another in a vehicle transverse direction, for a unitized body of the motor vehicle, the unitized body of which is also referred to as body-in-white, body structure or bodyshell. This means that the first bodyshell parts are a constituent part of the bodyshell of the motor vehicle, such that the entire bodyshell, or at least a part of the bodyshell, may be a constituent part of the front-end structure according to the invention. The front-end structure furthermore comprises a bulkhead, also referred to as partition or spray wall, for the unitized body, wherein the bulkhead is formed as a second bodyshell part for the unitized body. The bulkhead is thus also a constituent part of the unitized body or of the bodyshell. The bulkhead is preferably connected at least indirectly to the first bodyshell parts.

In order to now be able to realize particularly good crashworthiness and particularly high stiffness of the unitized body or of the bodyshell, the front-end structure comprises at least one assembly support which is formed as a third bodyshell part for the unitized body. The assembly support is thus also a constituent part of the unitized body or of the bodyshell, such that the first bodyshell parts, the bulkhead and the assembly support belong to the bodyshell of the motor vehicle. Here, at least a subregion of the bulkhead is covered toward the front in a vehicle longitudinal direction by the assembly support, such that the assembly support is arranged in front of the bulkhead in the vehicle longitudinal direction, or the bulkhead follows the assembly support to the rear in the vehicle longitudinal direction. The first bodyshell parts are connected to one another via the assembly support. For this purpose, the assembly support is for example connected at least indirectly, in particular directly, to the first bodyshell parts. The assembly support preferably extends at least substantially in a vehicle transverse direction, whereby the front-end structure is stiffened particularly effectively by means of the assembly support. The assembly support is preferably itself formed separately from the first bodyshell parts and connected to the first bodyshell parts, in particular by welding and/or adhesive bonding. The assembly support functions, for example, as a stiffening strut that is preferably connected to the first bodyshell parts, which are preferably arranged in front of the bulkhead in the vehicle longitudinal direction. For this purpose, the front-end structure or the unitized body is, as a whole, stiffened in a particularly advantageous manner.

The front-end structure according to the invention furthermore comprises a support element which is formed separately from the assembly support and separately from the first bodyshell parts and separately from the bulkhead and which is provided in addition to the assembly support, in addition to the first bodyshell parts and in addition to the bulkhead. The support element is mounted in vibration-damped fashion on the assembly support by means of mounting elements, such that the support element, which is formed for example as a support plate, does not belong to the bodyshell, or is not a constituent part of the bodyshell. In other words, the support element is a structural part which differs from the bodyshell or from the unitized body and which is provided in addition to the bodyshell or in addition to the unitized body. Owing to the fact that it is mounted in vibration-damped fashion on the assembly support, the structural part is thus mounted in vibration-damped fashion on the bodyshell. By virtue of the fact that the support element is mounted in vibration-damped fashion on the assembly support, the support element is connected in at least substantially decoupled or at least substantially vibration-decoupled fashion to the assembly support and thus to the bodyshell.

The respective mounting element is for example of elastically deformable form or formed from an elastically deformable material, in particular from rubber. In this way, the respective mounting element allows relative movements between the support element and the assembly support. By means of these relative movements between the assembly support and the support element, the respective mounting element is in particular elastically deformed, whereby vibration energy is converted into deformation energy. In this way, the relative movements between the support element and the assembly support are damped, such that vibrations of the support element can be damped by means of the respective mounting element.

It is preferably provided that the support element is mounted in vibration-damped fashion on the assembly support only or exclusively singly, such that preferably only a single vibration-decoupled connection of the support element to the assembly support is provided. Here, for example, the support element is mounted in vibration-damped fashion on the assembly support exclusively via the mounting elements, such that no further mounting stage via which the support element is mounted in vibration-damped fashion on the assembly support is provided.

At least one component for the motor vehicle, which component is formed separately from the first bodyshell parts, separately from the assembly support, separately from the support element, separately from the bulkhead and separately from the mounting elements and which is provided in addition to the first bodyshell parts, in addition to the assembly support, in addition to the bulkhead, in addition to the support element and in addition to the mounting elements, is held on the support element. In this way, the component is mounted on the assembly support and thus on the bodyshell via the support element. Since at least the support element is mounted in vibration-damped fashion on the assembly support, the component is mounted in vibration-damped fashion on the bodyshell at least singly or preferably multiply, such that a particularly advantageous connection of the component to the bodyshell can be realized. Here, the support element may for example function as an absorber, in particular as a vibration absorber, in order to be able to damp vibrations and thus movements of the component that take place relative to the bodyshell. The assembly support forms, for example, a particularly advantageous base for a connection of the component and possibly of at least one or more further components to the bodyshell, such that the component and preferably at least one or more further components can be connected to the bodyshell in a particularly advantageous manner.

The motor vehicle is preferably in the form of an electric vehicle, in particular in the form of a battery-electric vehicle. Here, the motor vehicle, in its fully produced state, has for example at least one electric machine by means of which the motor vehicle can be in particular electrically driven. The bulkhead extends for example at least partially, in particular at least predominantly or entirely, in a plane which is spanned by the vehicle transverse direction and the vehicle vertical direction. By means of the bulkhead, it is for example the case that the interior compartment of the motor vehicle is separated or divided from a region arranged in front of the interior compartment or in front of the bulkhead in the vehicle longitudinal direction, wherein the region is for example a compartment, an accommodating region or an accommodating space. For example, in the fully produced state of the motor vehicle, the abovementioned electric machine is arranged in the region, such that the region is also referred to as motor region or motor compartment. Here, for example, the bulkhead is at least partially covered toward the front in the vehicle longitudinal direction by the electric machine. If the motor vehicle is in the form of an electric vehicle, then the motor vehicle, in its fully produced state, has no combustion motor for driving the motor vehicle. In relation to motor vehicles with a conventional drive arrangement and thus with a combustion machine, additional structural space can be created in said region, in which the assembly support, the support element, the mounting elements and in particular the component can be arranged in a particularly advantageous manner. A starting point of the present invention is in particular that new developments of motor vehicles, in particular of battery-operated or battery-electric vehicles, demand a dedicated or new architecture in relation to vehicles with a purely conventional drive arrangement. Owing to electric machines which are much more compact in relation to combustion motors or combustion machines, and owing to the fact that classic transmissions can be omitted in electric vehicles, a completely different arrangement of assemblies and components can be made possible, in particular in said region. It is thus possible, for example in the case of new architectures of battery-electric vehicles, for a main drive assembly to be positioned for example in the rear end. The main drive assembly comprises, for example, the or an electric machine by means of which the motor vehicle can be electrically driven. It is now the intention to make the most optimum possible use of the space gained in said region owing to the omission of a large combustion motor.

In order to also ensure ergonomic utilization of interior space, the bulkhead can be shifted particularly far forward in the vehicle longitudinal direction in relation to conventional motor vehicles, which can result in relatively short overhangs. The shorter overhangs in relation to conventional motor vehicles with a conventional drive arrangement can however result in a conflict with requirements for crash safety. In the case of conventional motor vehicles, it has hitherto been possible to attain particularly high crash safety on the one hand owing to the large combustion motor positioned in the front end and on the other hand by way of long overhangs and an associated distance to the interior compartment.

By means of the front-end structure according to the invention, it is now possible, despite particular short overhangs that may be provided, to achieve particularly high crash safety in particular with regard to requirements for a frontal collision. In other words, by means of the front-end structure according to the invention, occupants of the motor vehicle can be protected in a particularly advantageous manner in the event of a frontal crash or a frontal collision even if the motor vehicle, in its fully produced state, has only very small overhangs.

The assembly support is preferably an at least substantially horizontally oriented plane or runs in an at least substantially horizontally oriented plane. In other words, the assembly support runs for example in a plane which is spanned by the vehicle transverse direction and the vehicle longitudinal direction. Since the assembly support is a constituent part of the bodyshell or of the unitized body, the assembly support is a load-bearing element, in particular of the bodyshell. The assembly support is preferably situated in the immediate vicinity of the bulkhead. In other words, it may be provided that the assembly support is spaced apart from the bulkhead in the vehicle longitudinal direction, such that a gap, in particular air gap, exists between the assembly support and the bulkhead in the vehicle longitudinal direction, in particular in the fully produced state of the motor vehicle. By means of the assembly support, particularly advantageous crashworthiness can be ensured because the assembly support makes it possible, in the event of a crash, in particular in the event of a frontal collision with a small width overlap, to absorb crash energy and transmit this for example into the rest of the front-end structure. In this way, the passenger cell can be protected, in particular against excessive deformation.

Since the first bodyshell parts, which are spaced apart from one another in the vehicle transverse direction, are connected to one another by means of the assembly support, the assembly support constitutes an at least substantially horizontal connection by means of which the first bodyshell parts are connected to one another. By means of this horizontal connection, it is possible to realize both particularly high overall stiffness of the body and particularly advantageous crashworthiness. Furthermore, the assembly support permits a particularly advantageous connection of the component to the bodyshell. For this purpose, the support element is provided. Here, the mounting elements function for example as damping, in particular vibration-damping, elements, by means of which vibrations and thus movements of the support element that take place relative to the assembly support can be damped. Here, it is preferably possible to realize a simple decoupled connection of the support element to the assembly support. By means of this vibration-damped connection of the support element and thus of the component, it is possible for particularly advantageous acoustic comfort of the motor vehicle to be realized.

In order to be able to realize particularly advantageous crashworthiness and particularly high stiffness, it is provided in one refinement of the invention that the first bodyshell parts are in the form of body domes. On each of the body domes, there can be or is supported at least or exactly one spring and/or damper element. The spring and/or damper element may for example be in the form of a suspension strut, such that the respective body dome may be in the form of a suspension strut dome. By means of the respective spring and/or damper element, at least or exactly one wheel of the motor vehicle can be or is supported in sprung and/or damped fashion on the unitized body.

A further embodiment is distinguished by the fact that the component is mounted on the support element, and thus held on the support element, in vibration-damped fashion by means of at least one further mounting element. In this way, it is possible to realize a connection of the component to the bodyshell with twofold or double decoupling, in particular vibration decoupling. In other words, a two-stage vibration-damped mounting of the component on the bodyshell can be realized. Here, firstly, the support element is mounted in vibration-damped fashion on the assembly support, whereby the component is also mounted in vibration-damped fashion on the assembly support. Secondly, the component is mounted in vibration-damped and thus at least substantially decoupled, in particular at least substantially vibration-decoupled, fashion on the support element, such that a two-stage vibration-damped mounting of the component on the bodyshell is implemented. The statements above and below relating to the respective first mounting element may readily also be transferred to the further mounting element and vice versa. It is thus possible, for example, for the further mounting element to be a damping element or to comprise a damping element. In other words, the further mounting element may be elastically deformable or formed from an elastically deformable material such as rubber, for example, such that the further mounting element for example allows relative movements between the component and the support element. By means of such movements of the component that take place relative to the support element, the further mounting element is, in particular elastically, deformed, whereby movements and thus vibrations of the component that take place relative to the support element are damped. Since furthermore movements of the support element that take place relative to the assembly support can be damped by means of the respective first mounting element, it is possible to ensure a particularly advantageous two-stage, vibration-decoupled connection of the component to the bodyshell. This is particularly advantageous in the case of very quiet electric vehicles, because excessive vibrations and resulting noises can be avoided or kept low. In this way, particularly advantageous acoustic characteristics of the motor vehicle can be realized.

In order to be able to connect the component to the bodyshell in a particularly advantageous manner, it is provided in a further refinement of the invention that the assembly support has at least one passage opening which is assigned to the component and which is extended through by at least one connecting element by means of which the component is held on the support element.

Here, it has been found to be particularly advantageous if the connecting element is a constituent part of the component or a constituent part of the support element or a structural element which is formed separately from the component and separately from the support element and which is thus provided in addition to the component and in addition to the support element.

In order to realize a connection of the component to the bodyshell which is particularly advantageous in terms of vibrations, it is provided in a further refinement of the invention that the connecting element is the further mounting element or is a constituent part of the further mounting element.

A further embodiment is distinguished by the fact that the support element is arranged on a first side of the assembly support and the component is arranged on a second side, which is averted from the first side in a vehicle vertical direction, of the assembly support. In this way, vibrations of the component can be damped in a particularly advantageous manner, because the support element, in particular in combination with the component, can function in a particularly advantageous manner as a vibration absorber.

It has been found to be particularly advantageous if the component comprises at least one compressor. This embodiment is based on the realization that compressors in particular can cause undesired vibrations and thus undesired noises, which can however now be avoided. The compressor may for example be a so-called air-conditioning compressor, by means of which a refrigerant of an air-conditioning system of the motor vehicle can be compressed. It has been found that in particular air-conditioning compressors in the case of very quiet electric motor vehicles can cause undesired vibrations and thus noises, which can however now be avoided.

In order to be able to damp vibrations in a particularly advantageous manner, it is provided in a further refinement of the invention that at least one further component which is formed separately from the bodyshell parts, separately from the assembly support, separately from the mounting elements, separately from the support element and separately from the component, and which is thus provided in addition to the bodyshell parts, in addition to the assembly support, in addition to the mounting elements, in addition to the support element and in addition to the component, is held on the support element. The further component is preferably held on the support element in a manner which bypasses the first component and bypasses the further mounting element. In this way, the support element can, in particular in interaction with the components, function in a particularly advantageous manner as an absorber, in particular as a vibration absorber, whereby vibrations can be damped in a particularly advantageous manner. Particularly advantageous noise characteristics can consequently be ensured.

A second aspect of the invention relates to a motor vehicle, preferably in the form of a passenger motor vehicle, which has a unitized body, also referred to as bodyshell or body-in-white. The motor vehicle comprises a front-end structure, in particular a front-end structure according to the first aspect of the invention. The front-end structure according to the second aspect of the invention comprises two first bodyshell parts, which are spaced apart from one another in a vehicle transverse direction, of the unitized body. Furthermore, the front-end structure according to the second aspect of the invention comprises a bulkhead which is formed as a second bodyshell part of the unitized body.

In order to now be able to realize particularly advantageous crashworthiness and particularly high stiffness of the body, the front-end structure and thus the unitized body and the motor vehicle comprise at least one assembly support which covers at least a subregion of the bulkhead toward the front in a vehicle longitudinal direction and which is formed as a third bodyshell part of the body and by means of which the first bodyshell parts are connected to one another. Furthermore, the motor vehicle according to the second aspect of the invention comprises a support element which is formed separately from the assembly support and separately from the first bodyshell parts and which is mounted in vibration-damped fashion on the assembly support by means of mounting elements and on which at least one component for the motor vehicle is held, said component being formed separately from the bodyshell parts, separately from the assembly support and separately from the mounting elements. Advantages and advantageous refinements of the first aspect of the invention are to be regarded as advantages and advantageous refinements of the second aspect of the invention and vice versa.

Details of the invention will emerge below from the description of the figures and from the drawings.

BRIEF DESCRIPTION OF THE DRAWINGS

In the figures, identical or functionally identical elements are denoted by the same reference designations.

DETAILED DESCRIPTION OF THE DRAWINGS

Figure 1:
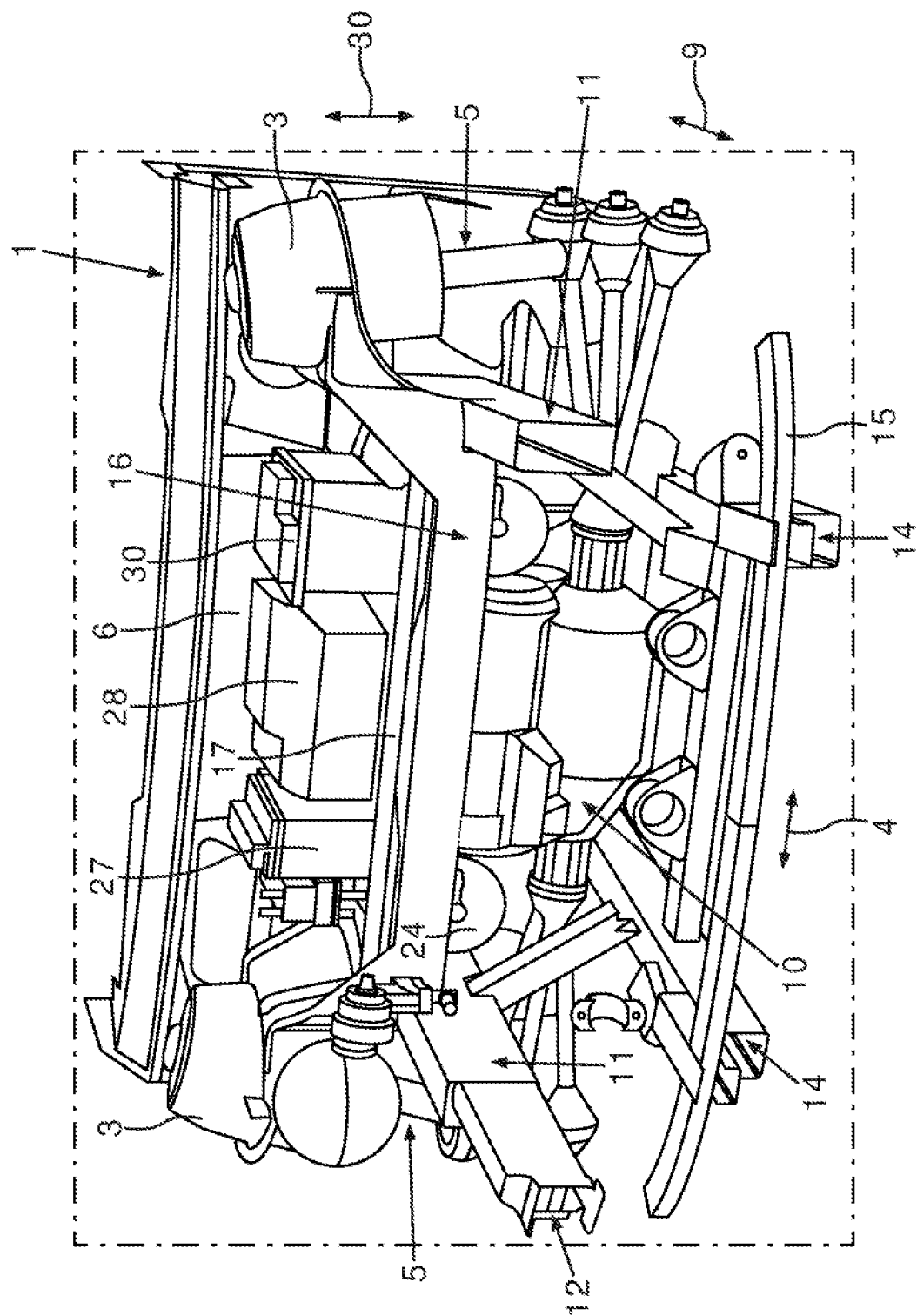
FIG. 1 shows a schematic and perspective front view of a front-end structure according to an embodiment of the invention for a motor vehicle in the form of a passenger motor vehicle.
Figure 5:
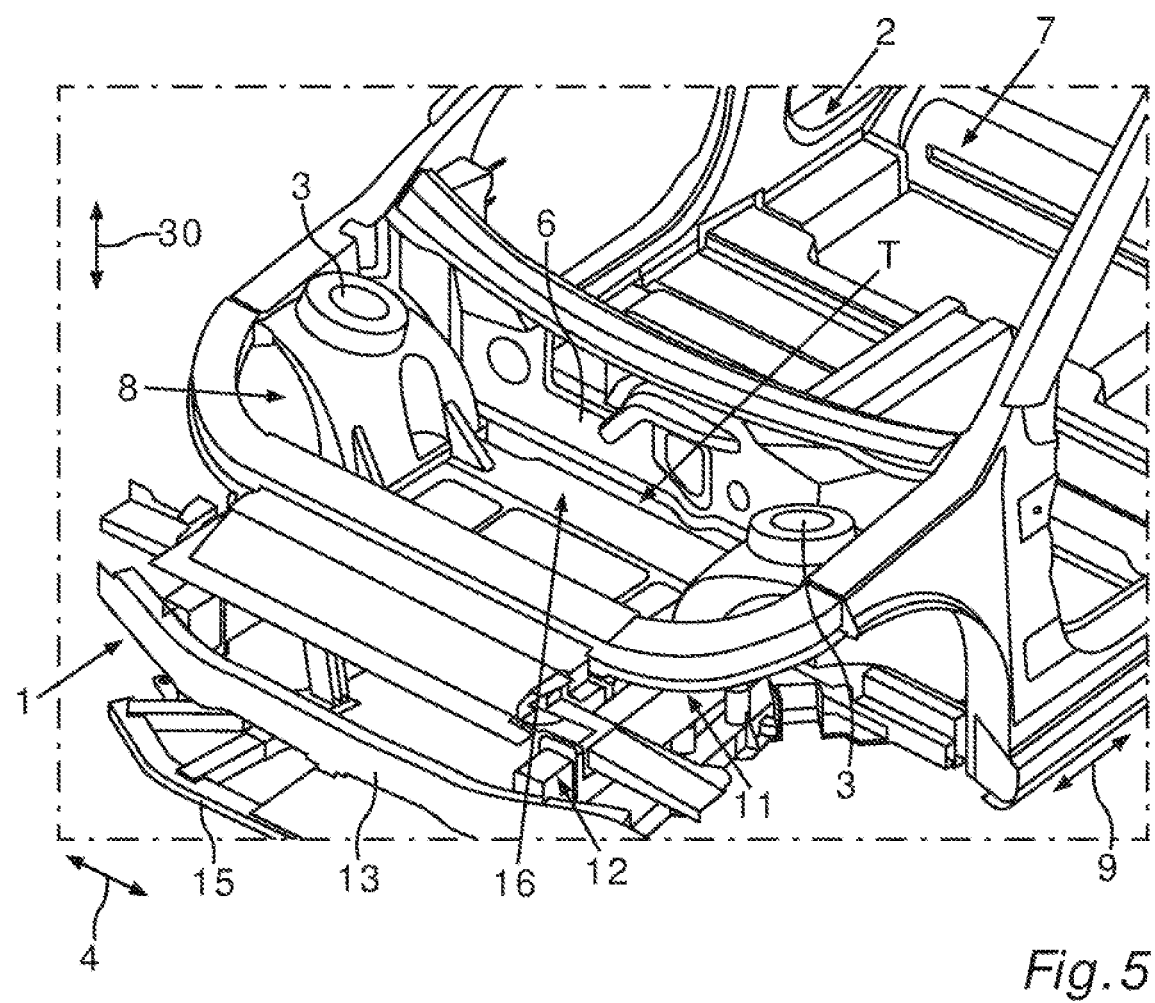
FIG. 5 shows, in a detail, a schematic perspective view of a unitized body of the motor vehicle.

FIG. 1 shows, in a schematic and perspective front view, a front-end structure 1 for a motor vehicle, which is in the form of a passenger motor vehicle and in this case of an electric vehicle, in particular a battery-electric vehicle. Here, the front-end structure 1 comprises—as will be discussed in more detail below—constituent parts of a unitized body 2, a detail of which can be seen in FIG. 5, of the motor vehicle. The motor vehicle thus has, in its fully produced state, the unitized body 2 and the front-end structure 1. As can be seen particularly clearly from FIG. 1, the front-end structure 1 has two first bodyshell parts, which are spaced apart from one another in a vehicle transverse direction, in the form of body domes 3 of the unitized body 2, which is also referred to as bodyshell or body structure or body-in-white. Here, in FIG. 1, the vehicle transverse direction is indicated by a double arrow 4. As can be seen in FIG. 1 on the basis of the example of one of the body domes 3, at least or exactly one spring and/or damper element 5 is supported on the respective body dome 3, wherein at least or exactly one wheel (not visible in the figure) of the motor vehicle is supported in sprung and/or damped fashion on the body 2 by means of the respective spring and/or damper element 5.

The front-end structure 1 furthermore comprises a bulkhead 6, also referred to as partition or spray wall, which is a second bodyshell part of the unitized body 2. Altogether, it is evident that both the body domes 3 and the bulkhead 6 are constituent parts of the bodyshell (unitized body 2). It can be seen particularly clearly from FIG. 5 that, by means of the bulkhead 6, the interior compartment 7 of the body 2 or of the motor vehicle is separated or divided in the vehicle longitudinal direction from a region 8 arranged in front of the interior compartment 7 and in front of the partition (bulkhead 6) in the vehicle longitudinal direction. Here, in FIG. 5, the vehicle longitudinal direction is indicated by a double arrow 9. The region 8 is also referred to as accommodating region, accommodating space or motor compartment because, in the fully produced state of the motor vehicle, at least or exactly one electric machine 10, visible in FIG. 1, of the motor vehicle is arranged in the region 8. Here, the electric machine 10 is operable in a motor mode and thus as an electric motor, by means of which the wheels that are supported in sprung and/or damped fashion on the body 2 by means of the spring and/or damper elements 5 can be electrically driven. In this way, the motor vehicle can be electrically driven by means of the electric machine 10. In order to operate the electric machine 10 in the motor mode, the electric machine 10 is supplied with electrical energy which is stored in a storage device designed for example as a battery, in particular as a high-voltage battery. The motor vehicle is thus preferably in the form of a battery-electric vehicle. Here, the bulkhead 6 is at least partially covered toward the front in the vehicle longitudinal direction by the electric machine 10.

The front-end structure 1 furthermore comprises two longitudinal members 11 which are spaced apart from one another in the vehicle transverse direction and to which a flexural transverse member 13 of the front-end structure 1 is connected, in particular via respective energy absorption elements 12. Here, the flexural transverse member 13 extends at least substantially in the vehicle transverse direction and at least partially covers the bulkhead 6 toward the front in the vehicle longitudinal direction. Here, the longitudinal members 11 are arranged in a first member plane. The front-end structure 1 also has a second member plane which is arranged below the first member plane in the vehicle vertical direction. Here, the vehicle vertical direction is indicated in FIG. 1 by a double arrow 30. In the second member plane, there are arranged further longitudinal members 14, which are spaced apart from one another in the vehicle transverse direction. Furthermore, in the second member plane, there is arranged a transverse member 15, by means of which the longitudinal members 14 are connected to one another. Accordingly, the longitudinal members 11 are also connected to one another via the flexural transverse member 13.

In order to now be able to realize a particularly high stiffness of the front-end structure 1 and thus of the body 2 and particularly advantageous crashworthiness of the motor vehicle, the front-end structure 1 comprises at least one assembly support 16 which covers at least a subregion T (FIG. 5) of the bulkhead 6 toward the front in the vehicle longitudinal direction and which is formed as a third bodyshell part of the unitized body 2 and which thus, like the body domes 3 and the bulkhead 6, belongs to the bodyshell of the motor vehicle. As can be seen in conjunction with FIG. 3, the assembly support 16 is of at least substantially U-shaped, pot-shaped or hat-shaped form in a plane, also referred to as x-z plane, spanned by the vehicle transverse direction and the vehicle vertical direction, and extends in this case at least substantially in the vehicle transverse direction. Here, the body domes 3 (first bodyshell parts) are connected to one another via the assembly support 16. For this purpose, the assembly support 16 is, at both sides or at both ends, attached to the body domes 3, that is to say connected to the body domes 3. For example, the assembly support 16, which is formed separately from the body domes 3, is welded and/or adhesively bonded and/or riveted to the body domes 3.

Since the assembly support 16 extends at least substantially in the vehicle transverse direction and, here, from a first of the body domes 3 in particular in uninterrupted fashion to the second of the body domes 3, and thus bridges a distance, running in the vehicle transverse direction, between the body domes 3, the assembly support 16 is also referred to as assembly bridge.

Figure 2:
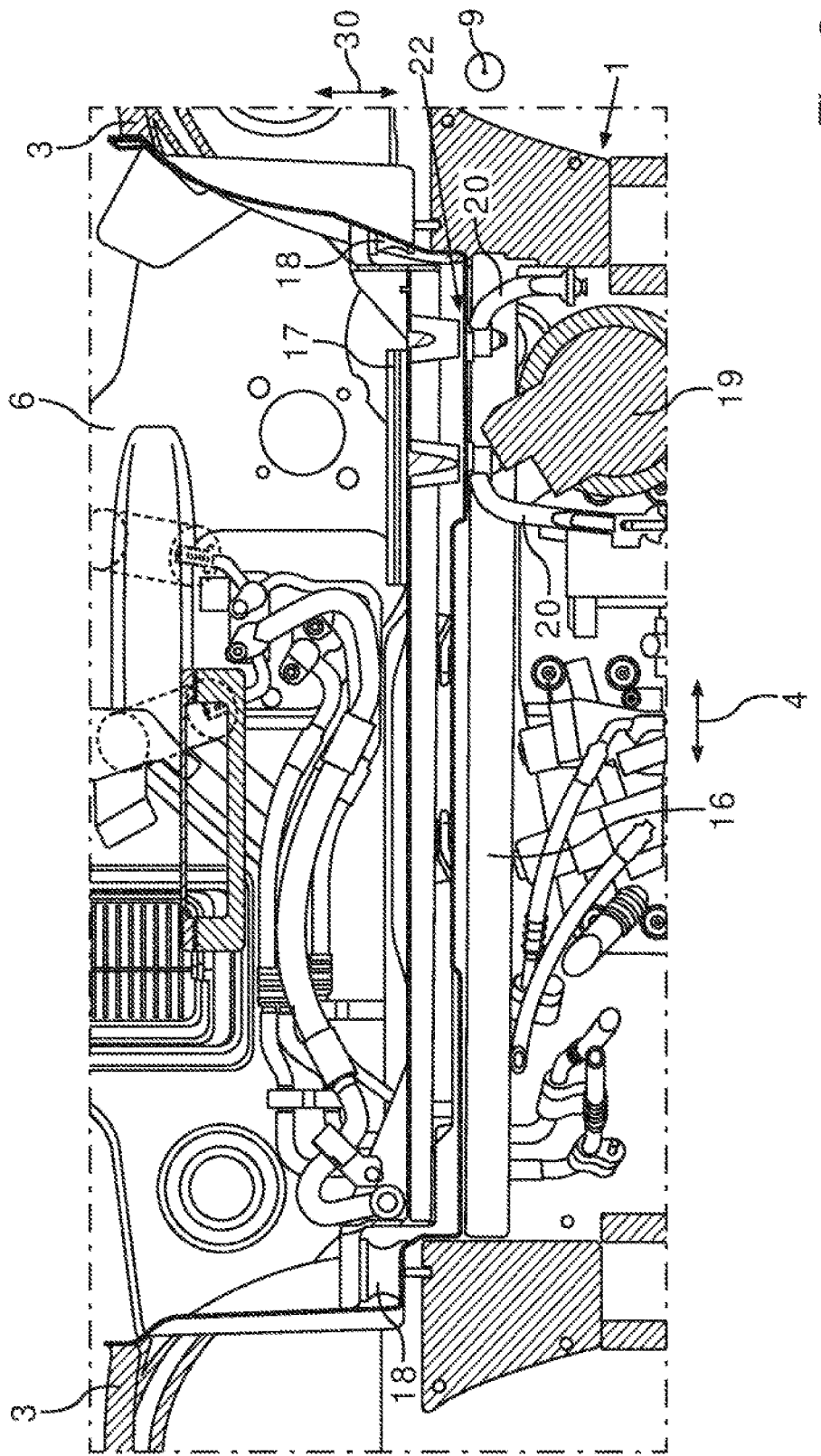
FIG. 2 shows, in a detail, a schematic and sectional front view of the front-end structure.
Figure 3:
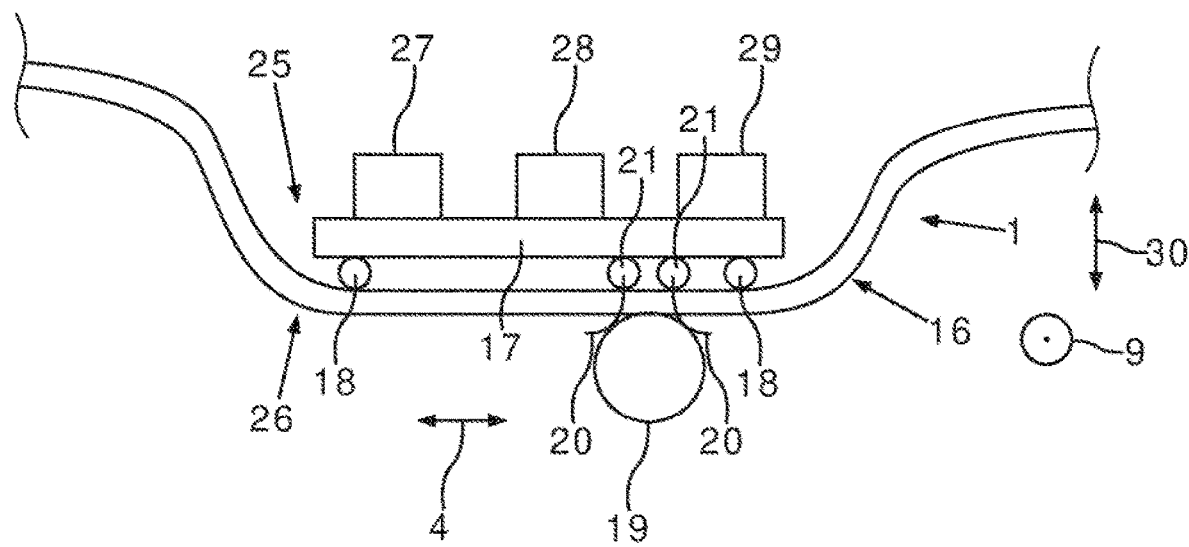
FIG. 3 shows, in a detail, a schematic front view of the front-end structure.

The front-end structure 1 furthermore comprises a support element 17 which is formed separately from the assembly support 16, separately from the body domes 3 and separately from the bulkhead 6, or separately from the unitized body 2 (bodyshell), and which is in the present case in the form of a support plate and which—as is illustrated in particularly schematic form in FIG. 3—is mounted in vibration-damped fashion on the assembly support 16 via mounting elements 18. In the present case, a singly vibration-damped mounting of the support element 17 on the assembly support 16 is provided such that, in the present case, a singly decoupled or vibration-decoupled connection of the support element 17 to the assembly support 16 is provided. Here, the mounting elements 18 allow movements and thus vibrations of the support element 17 which take place relative to the assembly support 16. By means of such relative movements between the assembly support 16 and the support element 17, the mounting elements 18 are elastically deformed, whereby vibration energy is converted into deformation energy. In this way, the vibrations of the support element 17 that take place relative to the assembly support 16 are damped. As can be seen from FIG. 2, the respective mounting element 18 is formed for example from an elastically deformable material, in particular from rubber or from an elastomer. In this way, vibration energy can be converted in a particularly advantageous manner into deformation energy, such that vibrations can be damped in a particularly effective manner.

Also provided is a first component 19 which is formed separately from the bodyshell and thus separately from the body domes 3, separately from the bulkhead 6 and separately from the assembly support 16 and which is also formed separately from the support element 17 and held on the support element 17. In the exemplary embodiment shown in the figures, the first component 19 is in the form of an air-conditioning compressor, which is a constituent part of an air-conditioning system for the air-conditioning of the interior compartment 7. The air-conditioning system comprises a refrigerant circuit which can be flowed through by a refrigerant and in which the air-conditioning compressor is arranged. Here, by means of the air-conditioning compressor, the refrigerant that flows through the refrigerant circuit can be compressed, such that the air-conditioning compressor is designed as a compressor or such that the component 19 has at least or exactly one compressor. Here, the component 19 is mounted in vibration-damped fashion on the support element 17, and thus held on the support element 17, via connecting elements 20 and further mounting elements 21. Here, the further mounting elements 21 allow relative movements between the component 19 and the support element 17. In the case of such relative movements between the component 19 and the support element 17, the mounting elements 21 are elastically deformed, whereby vibration energy is converted into deformation energy. In this way, movements and thus vibrations of the component 19 that take place relative to the support element 17 are damped. Since the mounting elements 21 damp vibrations of the support element 17, a doubly vibration-damped or doubly decoupled connection of the component 19 to the assembly support 16 and thus to the body 2 is provided in the present case. In this way, excessive vibrations of the air-conditioning compressor can be avoided, such that excessive noises can be avoided. Particularly advantageous noise characteristics of the motor vehicle can consequently be implemented.

Figure 4:
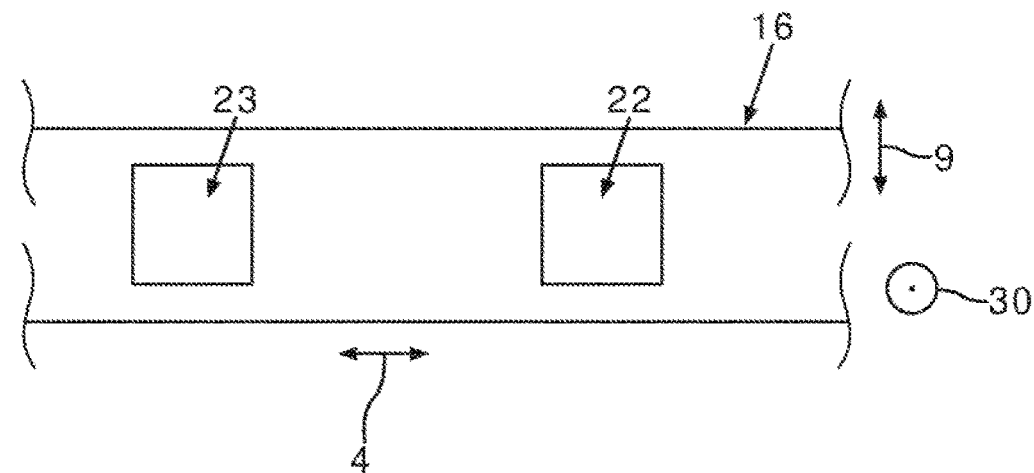
FIG. 4 shows, in a detail, a schematic plan view of the front-end structure.

In conjunction with FIG. 4, it can be seen that the assembly support 16 has at least one passage opening 22 assigned to the component 19. The passage opening 22 is extended through by the connecting elements 20. The component 19 is thus held, whilst extending through the passage opening 22, on the support element 17 such that a particularly advantageous, vibration-damped connection of the component 19 to the assembly support 16 can be implemented. It can be seen from FIG. 4 that the assembly support 16 also has a second passage opening 23 which is provided in addition to the passage opening 22 and which is spaced apart from the passage opening 22. It is thus possible, for example, for a further component, in particular a further air-conditioning compressor, to be held, whilst extending through the passage opening 23, on the support element 17. Said further component, for example in the form of a further air-conditioning compressor, can be seen in a detail in FIG. 1 and is denoted there by 24. The statements above and below relating to the component 19 may in this case readily be transferred to the component 24 and vice versa.

The connecting elements 20 may be constituent parts of the support element 17 or constituent parts of the component 19, in particular of a housing of the component 19. In the present case, however, the connecting elements 20 are formed separately from the support element 17 and separately from the component 19 and are thus provided in addition to the support element 17 and in addition to the component 19. For example, the connecting elements 20 are constituent parts of the mounting elements 21, or the connecting elements 20 and the mounting elements 21 form a mounting device by means of which the component 19 is mounted in vibration-damped fashion on the support element 17. Here, the mounting device extends through the passage opening 22.

In order to be able to damp vibrations of the component 19 in a particularly advantageous manner, the support element 17 is arranged on a first side 25, which points upward in the vehicle vertical direction, of the assembly support 16. Here, the component 19 is arranged on a second side 26, which points downward in the vehicle vertical direction and which is thus averted from the first side 25 in the vehicle vertical direction, of the assembly support 16.

The front-end structure 1 furthermore comprises further components 27, 28 and 29, which are provided in addition to the components 19 and 24. The component 28 is for example an electronic control unit and thus an electronic processing device. Alternatively or in addition, the component 29 may be an energy store which is designed for storing electrical energy and which is for example in electrochemical form and which is designed for example as a 12 volt battery, that is to say as a battery with an electrical voltage of 12 volts. Alternatively or in addition, the component 27 may be an electrical or electronic component. The components 27, 28 and 29 are for example held directly, and in particular in non-decoupled fashion, on the support element 17, such that the components 27, 28 and 29 are mounted in only singly vibration-damped fashion on the assembly support 16 via the support element 17. By contrast, the components 19 and 24 are mounted in doubly vibration-damped fashion on the assembly support 16. The support element 17 may, in particular with the components 27, 28 and 29, function as a particularly advantageous vibration absorber in order to damp vibrations of the components 19 and 24 in a particularly advantageous manner.

Altogether, it is evident that, by means of the assembly support 16, an at least substantially horizontally oriented plane is created which is arranged for example in the immediate vicinity of the bulkhead 6. Here, the assembly support 16 constitutes a jointly supporting connection by means of which the body domes 3 are connected to one another in the vehicle transverse direction. In this way, for example in the event of a frontal collision, in particular in the event of a frontal collision with a small width overlap, a particularly large amount of crash energy can be converted into deformation energy and thus absorbed, whereby the passenger cell can be protected in a particularly advantageous manner. Furthermore, particularly high overall stiffness of the body 2 can be ensured. Furthermore, the structurally fixed, jointly supporting connection in the form of the assembly support 16 forms a base for a particularly advantageous connection of the respective air-conditioning compressor, which can be connected in doubly decoupled fashion to the body 2. Furthermore, the assembly support 16 forms a particularly advantageous base for the components 27, 28 and 29, which, like the support element 17 itself, can be connected in singly decoupled fashion to the body 2.

LIST OF REFERENCE DESIGNATIONS

1 Front-end structure
2 Unitized body
3 Body dome
4 Double arrow
5 Spring and/or damper element
6 Bulkhead
7 Interior compartment
8 Region
9 Double arrow
10 Electric machine
11 Longitudinal member
12 Energy absorption element
13 Flexural transverse member
14 Longitudinal member
15 Transverse member
16 Assembly support
17 Support element
18 Mounting element
19 Component
20 Connecting element
21 Mounting element
22 Passage opening
23 Passage opening
24 Component
25 First side
26 Second side
27 Component
28 Component
29 Component
30 Double arrow
T Subregion

What is claimed is:

1. A front-end structure for a motor vehicle, comprising:
two first bodyshell parts, which are spaced apart from one another in a vehicle transverse direction, for a unitized body of the motor vehicle;
a bulkhead which is formed as a second bodyshell part for the unitized body;
at least one assembly support which forwardly covers at least a subregion of the bulkhead in a vehicle longitudinal direction and which is formed as a third bodyshell part for the unitized body and by which the two first bodyshell parts are connected to one another; and
a support element which is formed separately from the assembly support and separately from the two first bodyshell parts and which is mounted in vibration-damped manner on the assembly support via mounting elements and on which at least one component for the motor vehicle is held, wherein
the component is formed separately from the bodyshell parts, separately from the support element, and separately from the mounting elements.

2. The front-end structure according to claim 1, wherein the component is mounted on the support element, and thus held on the support element, in a vibration-damped manner by at least one further mounting element.

3. The front-end structure according to claim 2, wherein the assembly support has at least one passage opening which is assigned to the component and which is extended through by at least one connecting element by which the component is held on the support element.

4. The front-end structure according to claim 3, wherein the at least one connecting element is a constituent part of the component, a constituent part of the support element, or a structural element which is formed separately from the component and separately from the support element.

5. The front-end structure according to claim 3, wherein the connecting element is the further mounting element or is a constituent part of the further mounting element.

6. The front-end structure according to claim 3, wherein the support element is arranged on a first side of the assembly support and the component is arranged on a second side, which is averted from the first side in a vehicle vertical direction, of the assembly support.

7. The front-end structure according to claim 1, wherein the component comprises at least one compressor.

8. The front-end structure according to claim 1, further comprising:
at least one further component, which is formed separately from the bodyshell parts, separately from the support element, separately from the mounting elements, and separately from the component, is held on the support element.

9. A motor vehicle, comprising:
a unitized body; and
a front-end structure, the front-end structure comprising:
- two first bodyshell parts, which are spaced apart from one another in a vehicle transverse direction, of the unitized body;
- a bulkhead which is formed as a second bodyshell part of the unitized body;
- at least one assembly support which forwardly covers at least a subregion of the bulkhead in a vehicle longitudinal direction and which is formed as a third bodyshell part of the unitized body and by which the two first bodyshell parts are connected to one another; and
- a support element, which is formed separately from the assembly support and separately from the two first bodyshell parts and which is mounted in a vibration-damped fashion on the assembly support via mounting elements and on which at least one component for the motor vehicle is held, wherein the at least one component is formed separately from the bodyshell parts, separately from the support element, and separately from the mounting elements.

\* \* \* \* \*